(12) United States Patent
Megied et al.

(10) Patent No.: US 6,556,253 B1
(45) Date of Patent: Apr. 29, 2003

(54) MULTI-WINDOW PICTURE ADJUSTMENT ARRANGEMENT FOR A VIDEO DISPLAY

(75) Inventors: Magdy Megied, Zurich (CH); Manfred Muchenberger, Uster (CH)

(73) Assignee: Thomson Licensing S.A., Boulogne (FR)

( * ) Notice: Subject to any disclaimer, the term of this patent is extended or adjusted under 35 U.S.C. 154(b) by 300 days.

(21) Appl. No.: 09/599,629

(22) Filed: Jun. 22, 2000

Related U.S. Application Data (60) Provisional application No. 60/161,381, filed on Oct. 26, 1999.

(51) Int. Cl.$^7$ ................................................ H04N 5/45
(52) U.S. Cl. ....................................... 348/565; 348/673
(58) Field of Search .................................. 348/564, 563, 348/565, 673, 678, 569, 687, 688; H04N 5/45

(56) References Cited

U.S. PATENT DOCUMENTS

| | | | | |
|---|---|---|---|---|
| 5,675,391 A | * | 10/1997 | Yamaguchi et al. | 348/565 |
| 5,841,486 A | * | 11/1998 | Ando et al. | 348/565 |
| 5,969,767 A | * | 10/1999 | Ishikawa et al. | 348/564 |

FOREIGN PATENT DOCUMENTS

| | | | | |
|---|---|---|---|---|
| EP | 0675644 A2 | 4/1995 | | H04N/5/45 |

OTHER PUBLICATIONS

Reference Manual Paper entitled WinTV Installation and Reference Manual—pp. 1–2, 3–6, 3–7. Note: With (Win/TV), a PCI computer card from "Hauppauge" you can receive and watch TV programs on your computer monitor. The video signal is displayed in an overlaid window. You can adjust brightness, contrast and hue of the video signal within this window. The video chip used on this PCI card is a Rockwell Bt848.

* cited by examiner

*Primary Examiner*—Michael H. Lee
(74) *Attorney, Agent, or Firm*—Joseph S. Tripoli; Harvey D. Fried; Sammy S. Henig (57) ABSTRACT

In a multi-window arrangement, the light output attributable to each window in a multiple window display is calculated, for example, in accordance with the video signal that provides the picture information for display in the window and in accordance with the window area. When the total light output contributed by all the windows exceeds a predetermined level, a loop controller automatically reduces, for example, the contrast and the brightness in selected windows, in accordance with a rule, in a loop control manner. The result is that the total light output drops below the predetermined level.

16 Claims, 5 Drawing Sheets

FIG. 1A

| PICTURE OR WINDOW | CONTRAST LEVEL AS SET BY THE USER | BRIGHTNESS LEVEL AS SET BY THE USER | AREA | CONTRAST LEVEL AS CHANGED BY THE CONTROL LOOP | BRIGHTNESS LEVEL AS CHANGED BY THE CONTROL LOOP | CONTROL LOOP PARAMETER | MINIMUM & MAXIMUM USER CONTRAST LEVEL | MINIMUM & MAXIMUM USER BRIGHTNESS LEVEL | MINIMUM & MAXIMUM LOOP CONTRAST LEVEL | MINIMUM & MAXIMUM LOOP BRIGHTNESS LEVEL |
|---|---|---|---|---|---|---|---|---|---|---|
| W1 | $C1_{USER}$ | $B1_{USER}$ | $A1 = X1*Y1 - (A2 + A3 + A4)$ | $C1_{LOOP}$ | $B1_{LOOP}$ | $P1 = $ (AVERAGE VIDEO LEVEL OF W1) $* A1$ | $C_{MIN}$ $C_{MAX}$ | $B_{MIN}$ $B_{MAX}$ | $C_{LOOP-MIN}$ $C1_{USER}$ | $B_{LOOP-MIN}$ $B1_{USER}$ |
| W2 | $C2_{USER}$ | $B2_{USER}$ | $A2 = X2*Y2$ | $C2_{LOOP}$ | $B2_{LOOP}$ | $P2 = $ (AVERAGE VIDEO LEVEL OF W2) $* A2$ | $C_{MIN}$ $C_{MAX}$ | $B_{MIN}$ $B_{MAX}$ | $C_{LOOP-MIN}$ $C2_{USER}$ | $B_{LOOP-MIN}$ $B2_{USER}$ |
| W3 | $C3_{USER}$ | $B3_{USER}$ | $A3 = X3*Y3$ | $C3_{LOOP}$ | $B3_{LOOP}$ | $P3 = $ (AVERAGE VIDEO LEVEL OF W3) $* A3$ | $C_{MIN}$ $C_{MAX}$ | $B_{MIN}$ $B_{MAX}$ | $C_{LOOP-MIN}$ $C3_{USER}$ | $B_{LOOP-MIN}$ $B3_{USER}$ |
| W4 | $C4_{USER}$ | $B4_{USER}$ | $A4 = X4*Y4$ | $C4_{LOOP}$ | $B4_{LOOP}$ | $P4 = $ (AVERAGE VIDEO LEVEL OF W4) $* A4$ | $C_{MIN}$ $C_{MAX}$ | $B_{MIN}$ $B_{MAX}$ | $C_{LOOP-MIN}$ $C4_{USER}$ | $B_{LOOP-MIN}$ $B4_{USER}$ |

| PICTURE OR WINDOW | CONTRAST LEVEL AS SET BY THE USER | BRIGHTNESS LEVEL AS SET BY THE USER | AREA | CONTRAST LEVEL AS SET BY THE CONTROL LOOP | BRIGHTNESS LEVEL AS CHANGED BY THE CONTROL LOOP | CONTROL LOOP PARAMETER | MINIMUM & MAXIMUM USER CONTRAST LEVEL | MINIMUM & MAXIMUM USER BRIGHTNESS LEVEL | MINIMUM & MAXIMUM LOOP CONTRAST LEVEL | MINIMUM & MAXIMUM LOOP BRIGHTNESS LEVEL | SUM OF CONTROL LOOP PARAMETERS | REFERENCE CONTROL LOOP PARAMETER |
|---|---|---|---|---|---|---|---|---|---|---|---|---|
| W1 | $C1_{USER}$ | $B1_{USER}$ | $A1 = X1*Y1 - (A2 + A3 + A4)$ | $C1_{LOOP}$ | $B1_{LOOP}$ | $P1 = $ (AVERAGE VIDEO LEVEL OF W1) * A1 | $C_{MIN}$ $C_{MAX}$ | $B_{MIN}$ $B_{MAX}$ | $C_{LOOP-MIN}$ $C1_{USER}$ | $B_{LOOP-MIN}$ $B1_{USER}$ | $P1+P2+P3+P4$ | $P_{REF}$ |
| W2 | $C2_{USER}$ | $B2_{USER}$ | A2 | $C2_{LOOP}$ | $B2_{LOOP}$ | $P2 = $ (AVERAGE VIDEO LEVEL OF W2) * A2 | $C_{MIN}$ $C_{MAX}$ | $B_{MIN}$ $B_{MAX}$ | $C_{LOOP-MIN}$ $C2_{USER}$ | $B_{LOOP-MIN}$ $B2_{USER}$ | | |
| W3 | $C3_{USER}$ | $B3_{USER}$ | A3 | $C3_{LOOP}$ | $B3_{LOOP}$ | $P3 = $ (AVERAGE VIDEO LEVEL OF W3) * A3 | $C_{MIN}$ $C_{MAX}$ | $B_{MIN}$ $B_{MAX}$ | $C_{LOOP-MIN}$ $C3_{USER}$ | $B_{LOOP-MIN}$ $B3_{USER}$ | | |
| W4 | $C4_{USER}$ | $B4_{USER}$ | A4 | $C4_{LOOP}$ | $B4_{LOOP}$ | $P4 = $ (AVERAGE VIDEO LEVEL OF W4) * A4 | $C_{MIN}$ $C_{MAX}$ | $B_{MIN}$ $B_{MAX}$ | $C_{LOOP-MIN}$ $C4_{USER}$ | $B_{LOOP-MIN}$ $B4_{USER}$ | | |

MULTI-WINDOW PICTURE ADJUSTMENT ARRANGEMENT FOR A VIDEO DISPLAY

RELATED APPLICATIONS

This application claims the benefit of U.S. Provisional Application Serial No. 60/161,381 by Magdy Megeid, et al., filed Oct. 26, 1999 entitled MULTI-WINDOW PICTURE ADJUSTMENT.

The invention relates to an arrangement for adjusting a characteristic, for example, picture brightness or contrast, of a picture displayed in a multi-window arrangement.

BACKGROUND OF THE INVENTION

In a multimedia system, different sources of multimedia elements containing text, graphics, animation and motion video, respectively, are displayed on a display screen at different predefined regions in rectangular forms of different sizes, referred to as windows. Examples of windows are picture-in-picture (PIP), picture-outside-picture (POP) and picture-and-picture (PAP). The size of each window may be user adjustable on a window-by-window basis.

In a multi-window arrangement, the total light output of a displayed image is equal to the sum of the light outputs of each of the displayed windows that form an image. The total light output may be unequally shared between the displayed windows in a direct relationship to their concurrent picture contents. When the total light output is excessive, a window displaying a relatively dark picture might, disadvantageously, appear even darker than if the total light output were not excessive.

Television receivers or monitors having a cathode ray tube (CRT) usually include beam current limiting (BCL) arrangement. The BCL arrangement controls contrast and brightness levels of the video signals coupled to the CRT in order to limit the beam current for preventing excessive beam current. Thereby, the maximum light output of the CRT is limited by the BCL arrangement. Disadvantageously, the BCL arrangement reduces the contrast and brightness levels everywhere on the display screen of the CRT. As a result, a window having a dark picture, referred to as dark window, that does not contribute significantly to the total light output, would become, disadvantageously, even darker. There is a long felt need to readjust the light output produced in selective windows automatically, when the total light output of the display screen exceeds a predetermined level.

The light output attributable to each window can be calculated, for example, in accordance with the video signal that provides the picture information for display in the window and in accordance with the window area. When the total light output contributed by the windows exceeds the predetermined level, a loop controller automatically reduces, for example, the contrast and/or the brightness in selected windows, in accordance with a rule, in a loop control manner. The result is that the total light output drops below the predetermined level without necessarily making darker windows even darker.

A window presently selected by a user is referred to as an active window. All non-selected windows are referred to as inactive windows. More than one active window can be displayed at a given time. It can be desirable to exclude active windows from the automatic loop control adjustment.

In carrying out another inventive feature, the automatic loop control adjustment with respect to the active window is selectively disabled. Thereby, the contrast and/or brightness setting of the active window remains unchanged and unaffected by the automatic loop control adjustment. Selection of a new active window can automatically disable loop control in the newly active window and re-establish loop control in the previously active window.

Current flat panel displays such as Liquid Crystal Displays (LCD's), Plasma Displays (PD's) and Field Emission Displays (FED's) do not have a BCL arrangement. It can be desirable to provide for the flat panel display an arrangement analogous to the BCL arrangement for the CRT for readjusting the light output produced in corresponding windows selectively and automatically.

In carrying out a further inventive feature, the automatic loop control derives information regarding the magnitude of the total light output by combining values of the video signal calculated with respect to each window. Thereby, advantageously, the automatic loop control adjustment can be utilized in flat panel displays.

SUMMARY OF THE INVENTION

The long felt need of the prior art is satisfied in accordance with the inventive arrangements.

A video display apparatus, embodying an inventive feature, includes a display device for displaying an image. A source of a plurality of input video signals containing picture information for display in a plurality of windows to form the image is provided. An arrangement for determining when a magnitude of a light output of the plurality of windows is outside a range of values and when the magnitude is within the range of values is provided. A signal processor responsive to the plurality of input video signals is provided. The signal processor generating therefrom a plurality of output video signals that apply the picture information for display in the plurality of windows, respectively. The signal processor is responsive to an output of the light output determining arrangement for automatically varying at least one of a brightness characteristic and a contrast characteristic of a first output video signal, associated with a first of the windows relative to that of a second output video signal, associated with a second of the windows, when the magnitude of the light output of the image is outside the range of values.

DETAILED DESCRIPTION OF THE PREFERRED EMBODIMENTS

Figure 1A:
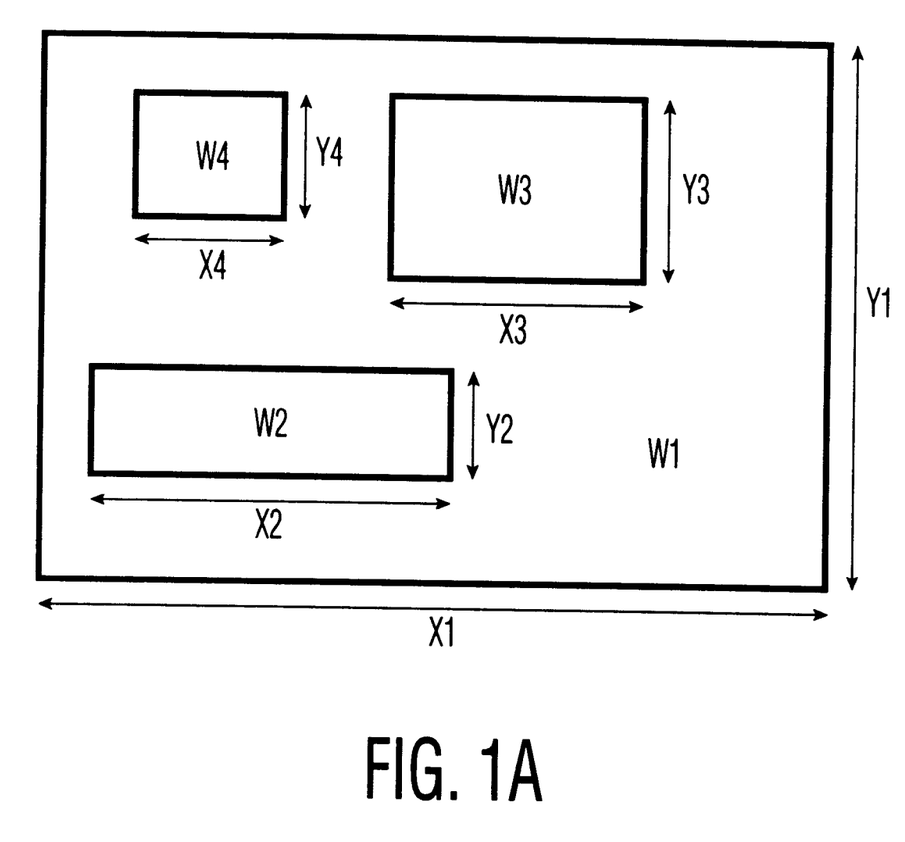
FIG. 1a illustrates an example of an image formed by overlaid windows, useful for explaining an aspect of the invention.
Figure 2:
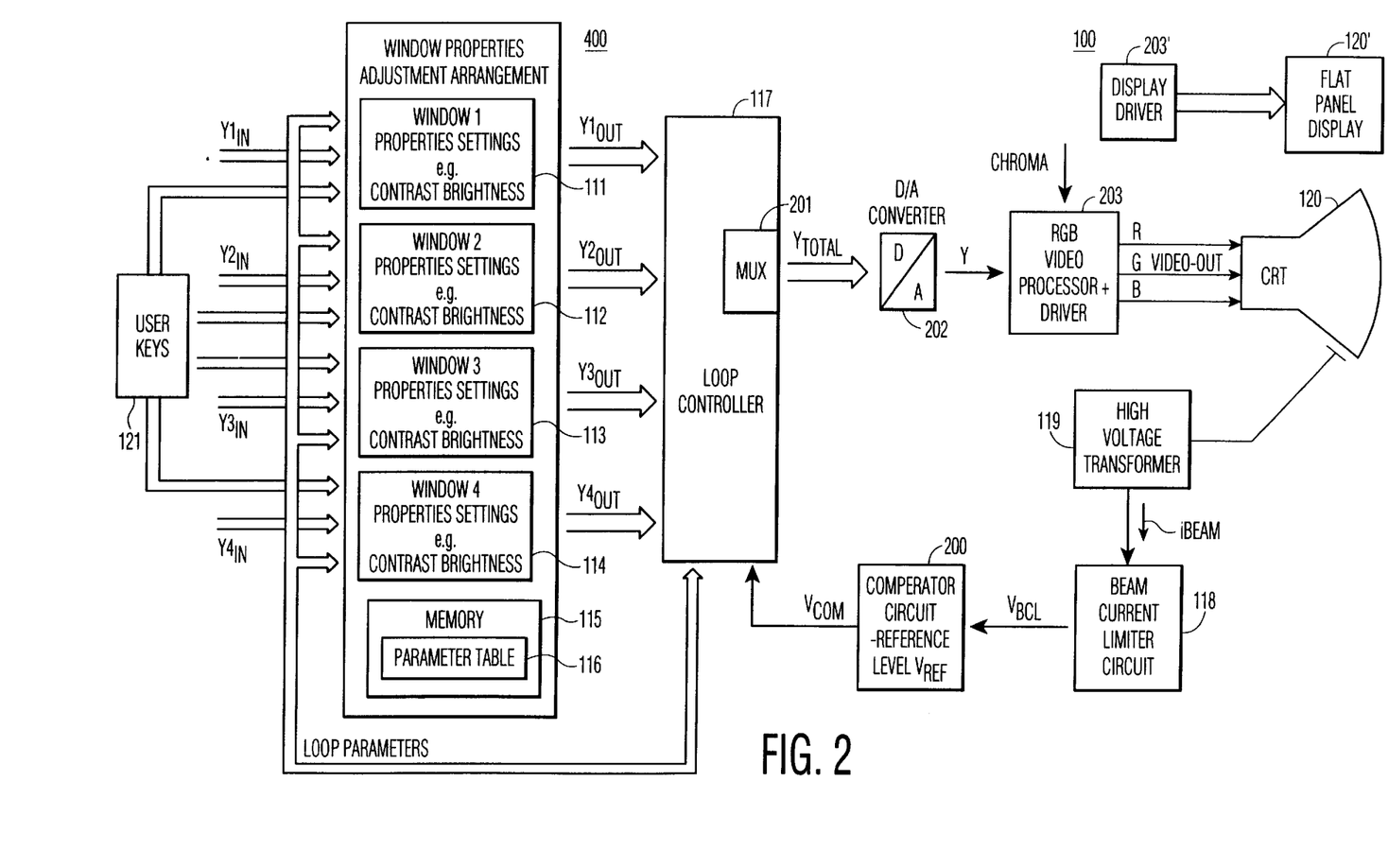
FIG. 2 illustrates a block diagram of a portion of a video controller, embodying an aspect the invention, of a television receiver or a monitor.

FIG. 2 illustrates a block diagram of a portion of a video controller 100, embodying an aspect the invention, for a television receiver or a monitor having a CRT 120. FIG. 1a is an illustrative example of a multi-window picture including a main window W1 and overlaid windows W2, W3 and W4, displayed on a screen of CRT 120 of FIG. 2. Each of windows W1, W2, W3 and W4 of FIG. 1a has horizontal dimensions X1, X2, X3 and X4 and vertical dimensions Y1, Y2, Y3 and Y4, respectively. Similar symbols and numerals in FIGS. 1a and 2 indicate similar items or functions.

Input luminance signals $Y1_{IN}$, $Y2_{IN}$, $Y3_{IN}$ and $Y4_{IN}$ of FIG. 2 are generated in a conventional way in corresponding video signal sources, not shown, of multimedia elements to provide, for example, text, graphics, animation and motion video, respectively. Each of signals $Y1_{IN}$, $Y2_{IN}$, $Y3_{IN}$ and $Y4_{IN}$ is provided in a digital form with, for example, an 8 bit resolution. For example, a main tuner of a television receiver, not shown, may provide information for display in window W1 of FIG. 1a and an auxiliary tuner may provide information for display in window W2; whereas, a VCR and a satellite receiver, not shown, may provide information for display in windows W3 and W4, respectively. Signals $Y1_{IN}$, $Y2_{IN}$, $Y3_{IN}$ and $Y4_{IN}$ are provided in a parallel manner but can be alternatively provided in a serial manner, not shown.

Signals $Y1_{IN}$, $Y2_{IN}$, $Y3_{IN}$ and $Y4_{IN}$ are coupled to a digital signal processor 400, embodying an inventive feature. The values of luminance signals $Y1_{IN}$, $Y2_{IN}$, $Y3_{IN}$ and $Y4_{IN}$, are multiplied in arithmetic processors 111, 112, 113 and 114 respectively, of digital signal processor 400 with variable multiplicands $C1_{LOOP}$, $C2_{LOOP}$, $C3_{LOOP}$ and $C4_{LOOP}$, respectively. Arithmetic processors 111–114 can be realized with a single arithmetic unit that performs the function of each. The multiplication results are summed with variable summands $B1_{LOOP}$, $B2_{LOOP}$, $B3_{LOOP}$ and $B4_{LOOP}$, respectively, for generating luminance output signals $Y1_{OUT}$, $Y2_{OUT}$, $Y3_{OUT}$ and $Y4_{OUT}$, respectively.

Output signals $Y1_{OUT}$, $Y2_{OUT}$, $Y3_{OUT}$ and $Y4_{OUT}$ are applied to a loop controller 117, embodying an inventive feature, of digital signal processor 400. Loop controller 117 produces variable multiplicands $C1_{LOOP}$, $C2_{LOOP}$, $C3_{LOOP}$ and $C4_{LOOP}$ and variable summands $B1_{LOOP}$, $B2_{LOOP}$, $B3_{LOOP}$ and $B4_{LOOP}$ that are stored in parameter table 116 of memory 115.

Figure 1B:
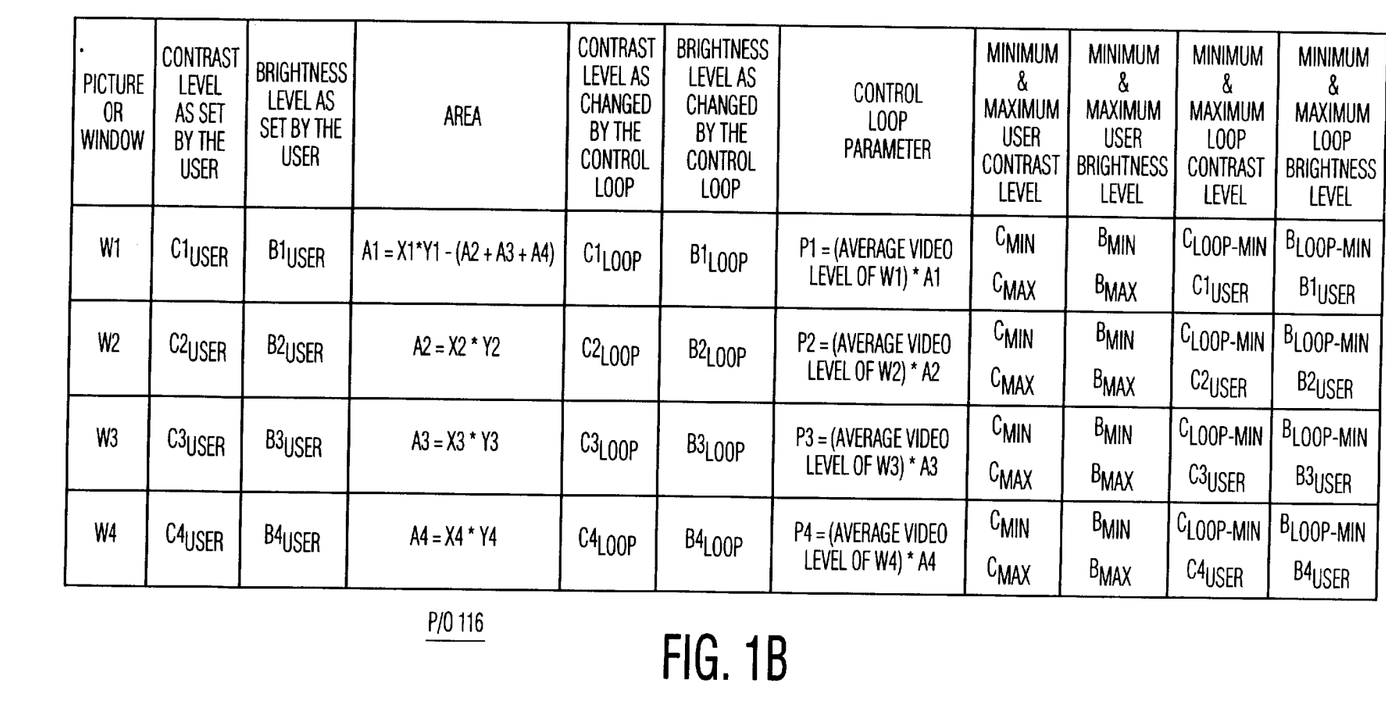
FIGS. 1b and 1c provide tables useful for explaining an aspect of the invention.

Multiplicands $C1_{LOOP}$, $C2_{LOOP}$, $C3_{LOOP}$ and $C4_{LOOP}$ up of FIG. 1b control the contrast levels and summands $B1_{LOOP}$, $B2_{LOOP}$, $B_{LOOP}$ and $B4_{LOOP}$ control the brightness levels in windows W1, W2, W3 and W4 of FIG. 1a, respectively. For example, the value of luminance signal $Y3_{IN}$ of window W3 of FIG. 1a is multiplied by variable multiplicand $C3_{LOOP}$ of FIG. 1b; thereby, the contrast level in window W3 of FIG. 1a can change when the value of multiplicand $C3_{LOOP}$ of FIG. 1b changes without affecting the contrast in each of the other windows W1, W2 and W4 of FIG. 1a. Similarly, the brightness level in window W3 can change by varying the value of summand $B3_{LOOP}$ of FIG. 1b without affecting the brightness of the other windows W1, W2 and W4 of FIG. 1a.

A multiplexer 201 of FIG. 2 selectively applies luminance signals $Y1_{OUT}$, $Y2_{OUT}$, $Y3_{OUT}$ and $Y4_{OUT}$ in corresponding time slots, not shown, for generating a multiplexed output signal $Y_{TOTAL}$ that is coupled to a digital-to-analog (D/A) converter 202. D/A converter 202 generates an analog luminance signal Y from the selected digital signal $Y1_{OUT}$, $Y2_{OUT}$, $Y3_{OUT}$ or $Y4_{OUT}$. Luminance signal Y is combined in a conventional manner in a Red-Green-Blue (RGB) video processor 203 with corresponding color signals, not shown, to produce video signals R, G and B for display on CRT 120.

FIG. 1b shows entries in a table 116 of memory 115 of FIG. 2 of multiplicands $C1_{LOOP}$, $C2_{LOOP}$, $C3_{LOOP}$ and $C4_{LOOP}$ and summands $B1_{LOOP}$, $B2_{LOOP}$, $B3_{LOOP}$ and $B4_{LOOP}$. Similar symbols and numerals in FIGS. 1a, 1b and 2 indicate similar items or functions.

User supplied variable multiplicand $C1_{USER}$, $C2_{USER}$, $C3_{USER}$ and $C4_{USER}$ of FIG. 1b, provided via a remote control 121 of FIG. 2 and stored in table 116, have, each, a value selected from a range of values between a minimum value $C_{MIN}$ and a maximum value $C_{MAX}$ of FIG. 1b that are, for example, set in the factory for identifying possible extreme contrast levels, respectively. Similarly, user supplied variable summands $B1_{USER}$, $B2_{USER}$, $B3_{USER}$ and $B4_{USER}$, provided via remote control 121 of FIG. 2 and stored in table 116, have, each, a value selected from a range of levels between minimum and maximum values $B_{MIN}$ and $B_{MAX}$ of FIG. 1b that are also, for example, set in the factory for identifying possible extreme brightness levels, respectively.

A range of values of each variable multiplicand $C1_{LOOP}$, $C2_{LOOP}$, $C3_{LOOP}$ and $C4_{LOOP}$ has a window-dependent maximum value, providing maximum contrast, equal to multiplicand $C1_{USER}$, $C2_{USER}$, $C3_{USER}$ or $C4_{USER}$, respectively, and a minimum value $C_{LOOP-MIN}$. Value $C_{LOOP-MIN}$, typically, provides a lower contrast and can be set to a contrast midrange. Value $C_{LOOP-MIN}$ can be common to each of the windows. Similarly, a range of values of each variable summand $B1_{LOOP}$, $B2_{LOOP}$, $B3_{LOOP}$ and $B4_{LOOP}$ can have a window-dependent maximum value, providing maximum brightness, equal to summand $B1_{USER}$, $B2_{USER}$, $B3_{USER}$ or $B4_{USER}$, respectively, and a minimum value $B_{LOOP-MIN}$. Value $B_{LOOP-MIN}$, typically, provides a lower brightness and can be set to a brightness midrange. Value $B_{LOOP-MIN}$ can be common to each of the windows. Advantageously, minimum values $B_{LOOP-MIN}$ and $C_{LOOP-MIN}$ can prevent the light output of each displayed window from becoming too low for preventing too dark window.

A beam current limiter (BCL) circuit 118 of FIG. 2 is coupled to a high voltage transformer 119. BCL circuit 118 provides beam current limiting in a conventional manner for providing hardware protection of CRT 120. BCL circuit 118 generates a control voltage $V_{BCL}$ that is directly proportional to an average value of a beam current ibeam drawn by CRT 120 that is indicative of a total light output of CRT 120. A comparator 200 having a threshold voltage level $V_{REF}$ is triggered, when voltage $V_{BCL}$ exceeds threshold voltage level $V_{REF}$, for generating an output signal VCOM. Signal VCOM indicates a condition of excessive light output and can be, for example, generated at a beam current smaller than that which triggers the aforementioned hardware protection of CRT 120 by BCL circuit 118. Signal VCOM is coupled to loop controller 117.

In a first example, assume that signal VCOM is not generated, when both multiplicands $C1_{LOOP}$, $C2_{LOOP}$, $C3_{LOOP}$ and $C4_{LOOP}$ are equal to multiplicands $C1_{USER}$, $C2_{USER}$, $C3_{USER}$ and $C4_{USER}$, respectively, and summands $B1_{LOOP}$, $B2_{LOOP}$, $B3_{LOOP}$ and $B4_{LOOP}$ are equal to summands $B1_{USER}$, $B2_{USER}$, $B3_{USER}$ and $B4_{USER}$, respectively. In the first example, loop controller 117 will cause neither the contrast nor the brightness to vary. This is so because there is a preference to maintain the user settings as long as the total light output is not excessive.

In a second illustrative example, assume that, at a given instant, area A3 of window W3 of FIG. 1a is the largest and that luminance signal $Y3_{OUT}$ of FIG. 2 produces on the average a high light output. Whereas, each of windows W1, W2 and W4 is dark or has a relatively low light output.

The operation of loop controller 117 in the second illustrative example is explained with reference to flow chart shown in FIG. 3. Similar symbols and numerals in FIGS. 1a, 1b, 2 and 3 indicate similar items or functions.

Figure 3:
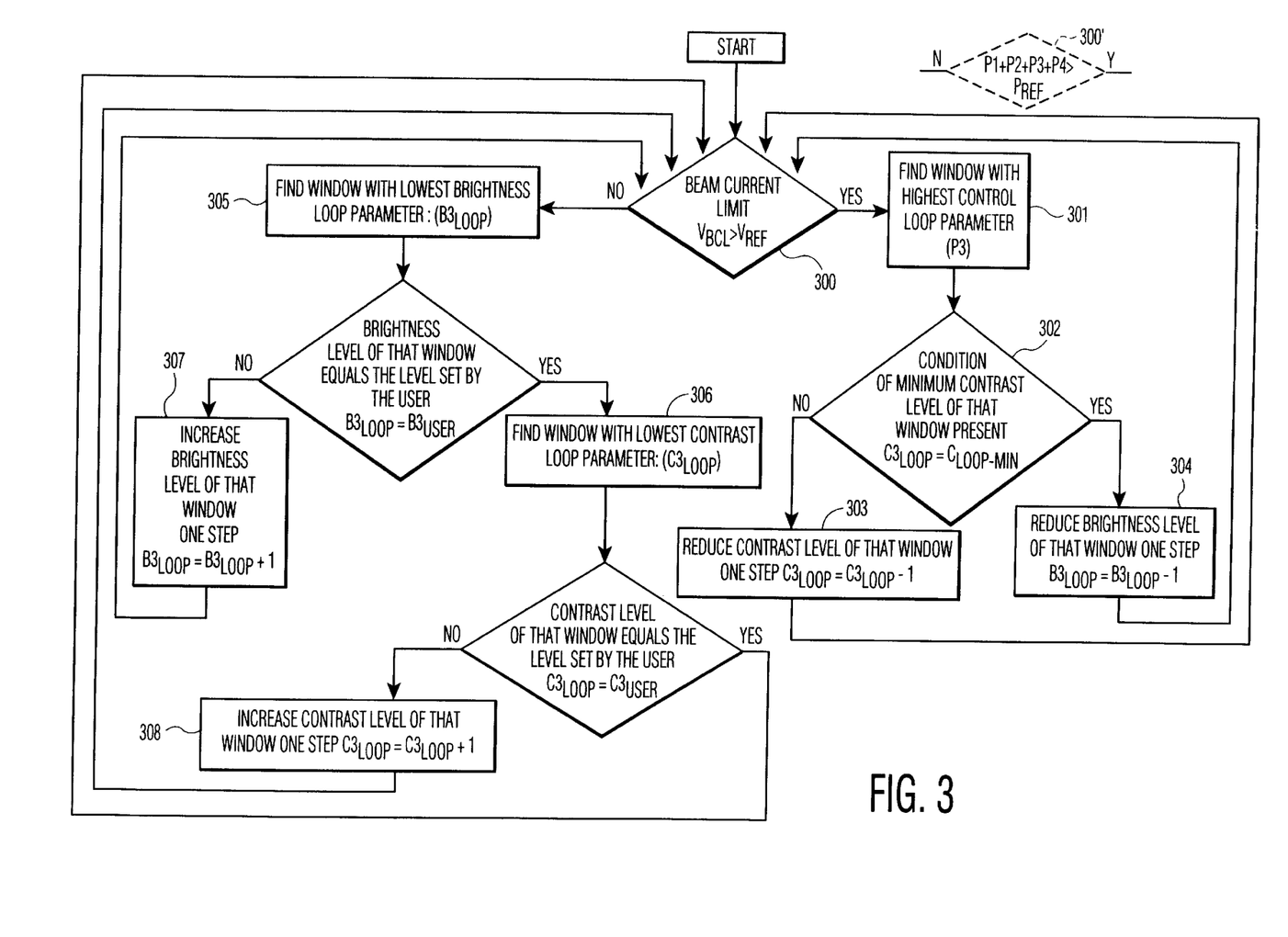
FIG. 3 provides a flow chart useful for explaining the operation of the arrangement of FIG. 2.

In step 300 of FIG. 3, the condition, voltage $V_{BCL}$ being larger than voltage $V_{REF}$, is detected, that occurs when beam current ibeam becomes excessive and that results in the generation of signal VCOM of FIG. 2. When in step 300, the condition, voltage $V_{BCL}$ being greater than voltage $V_{REF}$ is detected, automatic loop control procedure in loop controller 117 for adjusting the contrast and/or brightness is initiated, as shown in step 301.

The light output from a given window depends on both the window area and the average level of the video signal displayed within its boundary. Using dimensions X1,Y1; X2,Y2; X3,Y3 and X4,Y4 of windows W1, W2, W3 and W4, respectively, of FIG. 1a, loop controller 117 of FIG. 2, calculates and stores the values of areas A1, A2, A3 and A4, respectively, of FIG. 1a in parameter table 116 of FIG. 1b. Loop controller 117 of FIG. 2 multiplies an average value of luminance output signals $Y1_{OUT}$, $Y2_{OUT}$, $Y3_{OUT}$ and $Y4_{OUT}$ with window areas A1, A2, A3 and A4 of FIG. 1a for producing parameters P1, P2, P3 and P4 of FIG. 1b indicative of the light output of windows W1, W2, W3 and W4, respectively, of FIG. 1a.

In step 301, loop controller 117 of FIG. 2, using parameter table 116 of FIG. 1b, searches for the window with the highest loop parameter P1, P2, P3 or P4. Assume, that parameter P3 has been found in step 301 of FIG. 3 to have the highest value. Then, at step 302, multiplicand $C3_{LOOP}$ of FIG. 1b, representing the contrast level of window W3, is compared with value $C_{LOOP-MIN}$. If multiplicand $C3_{LOOP}$ is greater than value $C_{LOOP-MIN}$, then, in step 303, the value of multiplicand $C3_{LOOP}$ is decreased by one and is updated in parameter table 116.

The aforementioned steps of the automatic loop control procedure will be repeated in a similar manner until either the condition, voltage $V_{BCL}$ becoming smaller than voltage $V_{REF}$, or the condition, multiplicand $C3_{LOOP}$ becoming equal to parameter $C_{LOOP-MIN}$, is satisfied. In the former case, the total light output has been sufficiently reduced so that no further light output reduction is necessary. In the latter case, the total light output produced is still too high and a further light output decrease follows. Because multiplicand $C3_{LOOP}$ reaches value $C_{LOOP-MIN}$, loop controller 117 proceeds, in step 304, to decrease the brightness level controlled in accordance with summand $B3_{LOOP}$ of window W3. Advantageously, preventing multiplicands $C3_{LOOP}$ from decreasing below minimum value $C_{LOOP-MIN}$ prevents window W3 from becoming too dark.

In step 304, loop controller 117 decreases the value of summand $B3_{LOOP}$ by one and overwrites the old value of summand $B3_{LOOP}$ in table 116. Again, the automatic loop control procedure is repeated until the condition, voltage $V_{BCL}$ being smaller than voltage $V_{REF}$, is satisfied that usually occurs before the condition, summand $B3_{LOOP}$ being equal to summand $B_{LOOP-MIN}$, is satisfied. Advantageously, preventing summand $B3_{LOOP}$ from decreasing below minimum value $B_{LOOP}$ prevents window W3 from becoming too dark.

Thus, in the window having the present largest parameter, such as in window W3 having parameter P3 in the second example, the reduction of the contrast precedes any reduction in the brightness. This priority is established for preventing the window from becoming too dark.

If any of multiplicands $C1_{USER}$, $C2_{USER}$, $C3_{USER}$ and $C4_{USER}$ set by the user has a lower value than value $C_{LOOP-MIN}$, then loop controller 117 would not reduce the contrast in the window that corresponds to such multiplicand. Similarly, if any of summands $B1_{USER}$, $B2_{USER}$, $B3_{USER}$ and $B4_{USER}$ set by the user has a lower value than value $B_{LOOP-MIN}$, then loop controller 117 would not reduce the brightness in the window that corresponds to such summand. This is so because the light output in such window is already low.

In carrying out an aspect of the invention, loop controller 117 selectively reduces the contrast level only of a window, or window W3 in the second example, having a significant contribution to the total light output, if comparator 200 is triggered. Whereas, the light output of windows W1, W2 and W4, each having a low light output, is kept unchanged.

Assume that, in time, the total light output of windows W1, W2, W3 and W4 of FIG. 1a decreases because of a decrease in the brightness/contrast characteristic of at least one of luminance signals $Y1_{IN}$, $Y2_{IN}$, $Y3_{IN}$ and $Y4_{IN}$ of FIG. 2, respectively. Consequently, the total light output drops to a lower value that enables an increase in contrast/brightness characteristic of luminance output signals $Y1_{OUT}$, $Y2_{OUT}$, $Y3_{OUT}$ and $Y4_{OUT}$.

Thus, assume that in step 300 of FIG. 3, the condition, voltage $V_{BCL}$ being smaller than or equal to voltage $V_{REF}$, is detected, that occurs when beam current ibeam is no longer excessive. Therefore, restoration of multiplicand $C3_{LOOP}$ and summand $B3_{LOOP}$ in a direction closer to the values of multiplicand $C3_{USER}$ and summand $B4_{USER}$, respectively, set by the user is initiated in step 305.

In step 305, brightness summand $B3_{LOOP}$ having the lowest value in the second example, is found. The value of summand $B3_{LOOP}$ is lower than each of summand $B1_{LOOP}$, $B2_{LOOP}$, and $B4_{LOOP}$. This is so, because summand $B1_{LOOP}$, $B2_{LOOP}$, and $B4_{LOOP}$, in the second example, remain unmodified at their maximum values, equal to summands $B1_{USER}$, $B2_{USER}$ and $B4_{USER}$, respectively The value of summands $B3_{LOOP}$ is incremented by one in step 307 and updated in parameter table 116. This automatic loop control procedure will be repeated until either the condition, voltage $V_{BCL}$ being smaller than or equal to voltage $V_{REF}$, is no longer satisfied or the condition, summands $B3_{LOOP}$ being equal to summands $B3_{USER}$ is satisfied.

Step 306 occurs if the condition, summands $B3_{LOOP}$ being equal to summands $B3_{USER}$, is satisfied. Step 306 identifies contrast multiplicand $C3_{LOOP}$ as being the lowest value in the second example, is found. The value of multiplicand $C3_{LOOP}$ is lower than each of multiplicands $C1_{LOOP}$, $C2_{LOOP}$ and $C4_{LOOP}$. This is so, because the multiplicands $C1_{LOOP}$, up $C2_{LOOP}$, and $C4_{LOOP}$ remain unmodified at their maximum values, equal to multiplicands $C1_{USER}$, $C2_{USER}$ and $C4_{USER}$, respectively. The value of multiplicand $C3_{LOOP}$ is incremented by one in step 308 and updated in parameter table 116. This automatic loop control procedure will be repeated until either the condition, voltage $V_{BCL}$ being smaller than or equal to voltage $V_{REF}$, is no longer satisfied or the condition, multiplicand $C3_{LOOP}$ being equal to multiplicand $C3_{USER}$, is satisfied. Preferably, parameter table 116 can be periodically updated, for example, every two video fields or every 40 ms.

FIG. 2 also illustrates an example of a flat panel display 120', forming an alternative to CRT 120. In the case of flat panel display 120' D/A converter 202, RGB video processor 203, transformer 119 and BCL circuit 118 are not used. Instead, a display driver 203' is utilized.

Figure 1C:
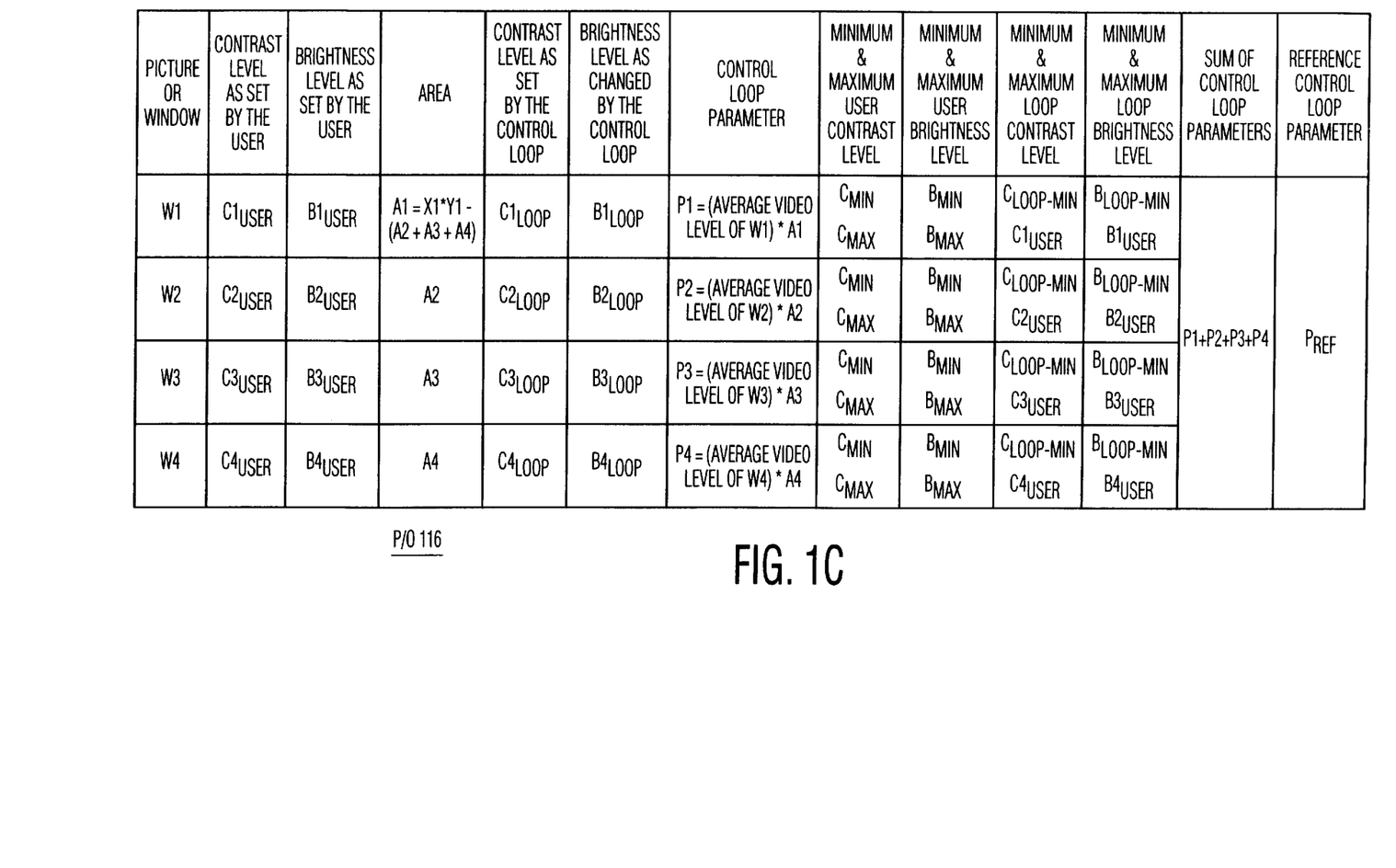

The entries in table 116 of FIG. 1b are also applicable to the flat panel display alternative. In addition, FIG. 1c provides additional entries for table 116 of FIG. 1b that are applicable to the flat panel display alternative. Differences between the flat panel display and CRT alternatives and the way they operate are noted below.

In FIG. 1c, the left column provides a parameter $P_{SUM}$ that is equal to the sum of automatic loop control parameters, P1+P2+P3+P4, which is proportional to the present total light output of display 120' of FIG. 2. Parameter $P_{SUM}$ of FIG. 1c is analogous to control voltage $V_{BCL}$. The right column in FIG. 1c provides a reference loop parameter $P_{REF}$, which corresponds to a high light output level. Parameter $P_{REF}$ is analogous to control voltage $V_{REF}$. Thus, replacing voltages $V_{BCL}$ and $V_{REF}$ by parameters $P_{SUM}$ and $P_{REF}$, respectively, makes it possible to realize an alternative automatic loop control arrangement that does not depend on beam current information but still performs the analogous function. Furthermore, such an arrangement could also be used in the arrangement that includes CRT 120.

A high light output condition is detected as a result of parameter $P_{SUM}$ being greater than parameter $P_{REF}$. When high light output condition is detected, loop controller 117 searches for the window having the highest value of loop parameters P1, P2, P3 and P4, using parameter table 116. Loop controller 117 performs the same procedures as shown in the flow charts of FIG. 3 except that in a step 300', forming an alternative to step 300, voltages $V_{BCL}$ and $V_{REF}$ are substituted with parameters $P_{SUM}$ and $P_{REF}$, respectively. It is possible to have parameter $P_{REF}$ with a constant value, as adjusted in the factory according to a predetermined high light output level. Alternatively, this value can, advantageously, be made variable by the user. Advantageously, changing parameter $P_{REF}$ also changes the total subjective impression of the picture.

What is claimed is:

1. A video display apparatus, comprising:

a display device for displaying an image; a source of a plurality of input video signals containing picture information for display in a plurality of windows including a window having a selectable size to form said image; and a signal processor responsive to said plurality of input video signals for applying the picture information for display in said plurality of windows, said signal processor automatically varying at least one of a brightness characteristic and a contrast characteristic of a first output video signal, associated with a first of said windows, relative to that of a second output video signal, associated with a second of said windows, when a magnitude of a light output of said image is outside a range of values, the variation being adjusted in accordance with said size selection.

2. A video display apparatus according to claim 1 wherein said signal processor is responsive to said input video signals for deriving said light output magnitude via a signal path that excludes said display device.

3. A video display apparatus according to claim 1 wherein said display device comprises a cathode ray tube and wherein said signal processor comprises a comparator responsive to a beam current of said cathode ray tube for determining said light output magnitude.

4. A video display apparatus according to claim 1, wherein variation of said at least one characteristic associated with an active window is prevented.

5. A video display apparatus according to claim 1 wherein said signal processor is responsive to said input video signal for deriving said light output magnitude via a signal path that excludes said display device.

6. A video display apparatus, comprising:

a display device for displaying an image;

a source of a plurality of input video signals containing picture information for display in a plurality of windows including a window at an inactive state and a window at an active state to form said image; and a signal processor responsive to said plurality of input video signals for applying the picture information for display in said plurality of windows, said signal processor automatically varying at least one of a brightness characteristic and a contrast characteristic of a first output video signal, associated with a first of said windows, relative to that of a second output video signal associated with a second of said windows, when both a light output of said image is outside a range of values and said first window is at said inactive state.

7. A video display apparatus, comprising:

a display device for displaying an image;

a source of a plurality of input video signals containing picture information for display in a plurality of windows to form said image; and a signal processor responsive to said plurality of input video signals for applying the picture information for display in said plurality of windows, said signal processor automatically varying at least one of a brightness characteristic and a contrast characteristic of a first output video signal, associated with a first of said windows, relative to that of a second output video signal, associated with a second of said windows, when a magnitude of a light output of said image is outside a range of values, said signal processor deriving said light output magnitude via a signal path that excludes said display device.

8. A video display apparatus according to claim 7 wherein said display device comprises a flat panel display.

9. A video display apparatus according to claim 7 wherein, when the light output magnitude is excessive, and said at least one characteristic exceeds a minimum level, said at least one characteristic of said first output video signal is reduced in a manner to reduce the light output magnitude.

10. A video display apparatus according to claim 7 wherein, when the light output magnitude is excessive, said first output video signal is selected, among a second plurality of said output video signals on a basis of a contribution to the light output magnitude of said first output video signal being higher than a contribution to the light output magnitude of each of said second plurality of said output video signals.

11. A video display apparatus according to claim 7 wherein, when the light output magnitude is excessive, and a minimum level of said contrast characteristic has not been reached, said contrast characteristic is reduced before any reduction in said brightness characteristic occurs, and only after said minimum level of said contrast characteristic has been reached, said brightness characteristic is reduced.

12. A video display apparatus according to claim 7 wherein, when the light output magnitude is not excessive, said at least one characteristic of said first output video signal is increased in a manner to increase the light output, until said at least one characteristic does not exceed a maximum level.

13. A video display apparatus according to claim 7 wherein, when the light output magnitude is not excessive, said first output video signal is selected among a second plurality of said output video signals for increasing said at least one characteristic thereof on a basis of said brightness characteristic of said first output video signal being lower than that of each of said second plurality of said output video signals.

14. A video display apparatus according to claim 7 wherein, when the light output magnitude is not excessive, and as long as a maximum level of said brightness characteristic has not been reached, said brightness characteristic is increased before any increase in said contrast characteristic occurs, and after said maximum level of said brightness characteristic has been reached, said contrast characteristic is increased.

15. A video display apparatus according to claim 7 wherein said signal processor varies the contrast characteristic by multiplying a value of said first input video signal with a first multiplicand and the brightness characteristic by adding a value of a first summand.

16. A video display apparatus according to claim 7 wherein said signal processor operates in a loop control manner.

* * * * *